United States Patent Office 3,647,716
Patented Mar. 7, 1972

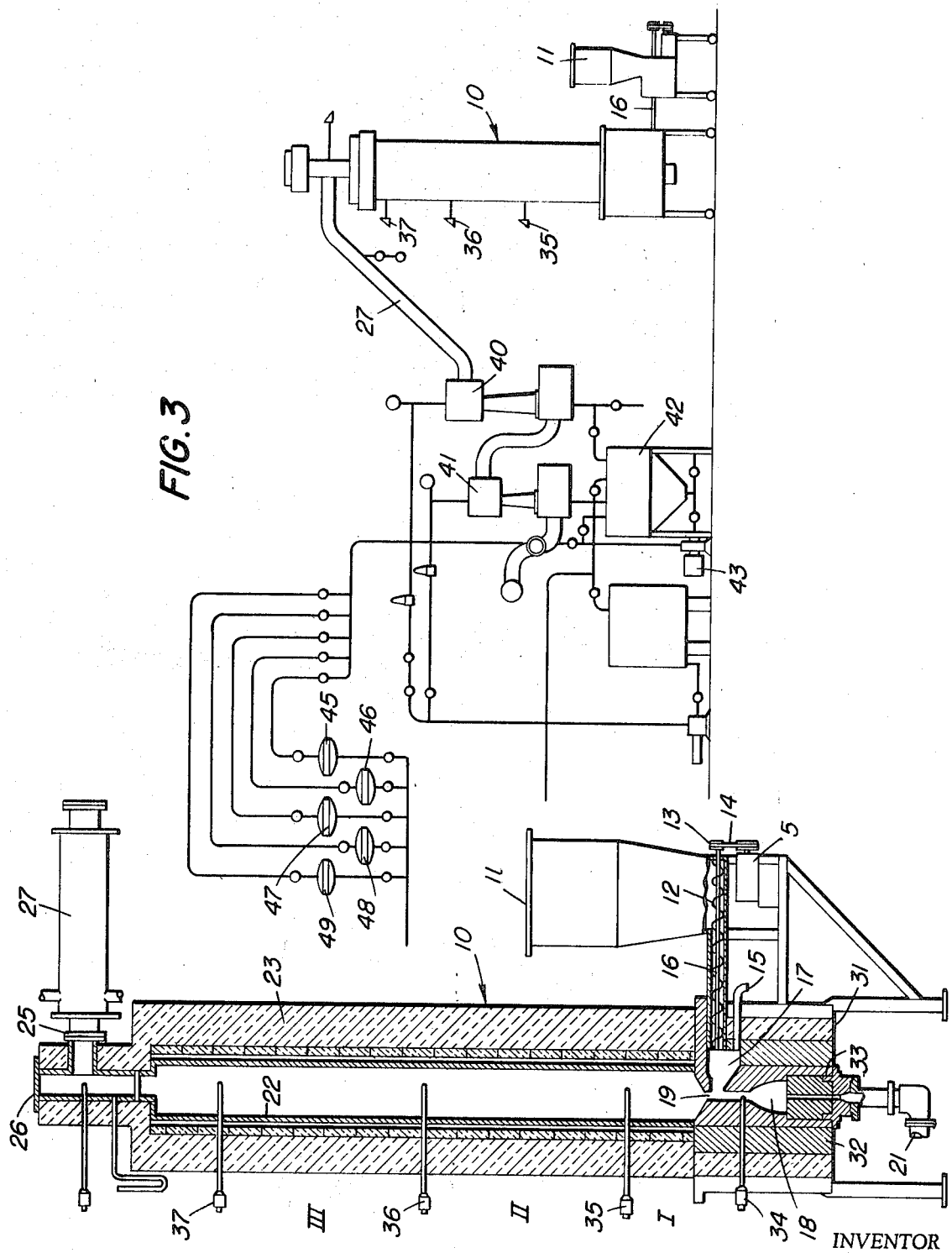

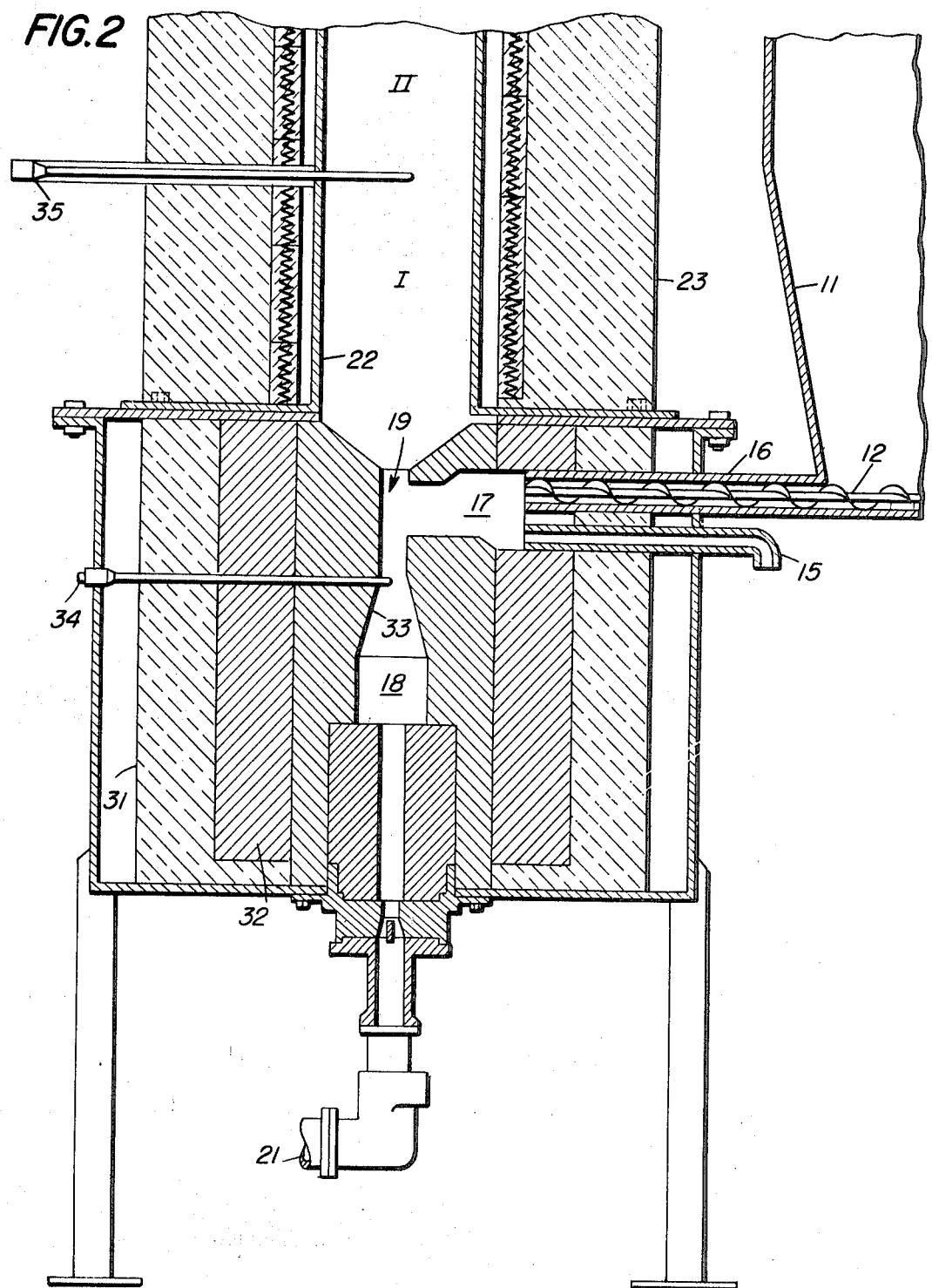

3,647,716
TRANSPORT REACTOR WITH A VENTURI TUBE CONNECTION TO A COMBUSTION CHAMBER FOR PRODUCING ACTIVATED CARBON
Charles F. Koches, Covington, Va., assignor to Westvaco Corporation, New York, N.Y.
Filed Apr. 3, 1970, Ser. No. 25,442
Int. Cl. C01b *31/08;* C10b *1/04*
U.S. Cl. 252—445       7 Claims

ABSTRACT OF THE DISCLOSURE

A continuous process and apparatus is described for producing a high yield activated carbon, or for regenerating a spent activated carbon. The activation process is carried out by introducing the raw material in a finely divided state into a fired reactor chamber where the raw material is subjected to a uniform heat transfer during its transport by the gaseous phase of the reactor chamber combustion products.

SUMMARY OF INVENTION

The present invention relates generally to an improved process and novel apparatus for the continuous reactivation of spent carbonaceous adsorbents, or the manufacture of activated carbon from virgin raw material. More particularly, the invention is intended to define a process and apparatus which achieves a continuous, optimum, and uniform heat transfer and mixing of gas reactants with a finely divided carbonaceous solid for the purpose of producing a high yield activated carbon, or for the regeneration of a spent activated carbon.

An object of this invention is to provide a process and apparatus for the reactivation of powdered carbonaceous adsorbents at a much lower investment in equipment and services than is customary with other processes in this area.

Another object of the present invention is the provision a method of reactivation which is subject to carefully controlled operation to produce a superior product at a low cost.

An additional object of the invention is to reactivate the adsorbent carbon by employing a gas transport process where the finely divided raw material is kept in a state of suspension during the activating process.

In the process, the maintenance of the finely divided material in a state of flotation as it is transported through the activation zone, results in practically complete penetration of each particle of the raw material by the gaseous phase of the reactor combustion products. The finely divided state of the raw material also enables the process to be controlled and regulated much more uniformly than heretofore known. The process is extremely fast and the yield of active carbon is materially increased over known methods.

These advantages can only practically be attained where all of the particles of carbonaceous material are kept in intimate contact with the reaction gases during the entire treatment, so that the heat and gases applied can uniformly penetrate and activate the material.

Another object of the present invention is the provision of novel apparatus which is adaptable to activate finely divided wet or dry carbonaceous solids.

Still another object of the invention lies in the ability of the process to regenerate carbon particles in the powdered state. In fact, with the novel process herein described, the smaller and more uniform the particles are, the better are the results obtained as regards activation.

Still further objects and the entire scope of applicability of the present invention will become apparent from the detailed description set forth hereinafter.

In the commercial use of granular adsorbent carbon, such as in the decolorization of sugar syrups by activated carbon, the adsorbent becomes saturated with various contaminants, some of which are responsible for the color of the syrups. At some particular degree of saturation, the carbon is no longer effective in a practical sense and must be reactivated by some means if the economy of repeated use is to be realized. Such reactivation must be accomplished at a low cost, and the reactivation must be carried out so as to produce, (a) a high degree of recovery in adsorptive power, and, (b) a low volume loss of the carbonaceous adsorbent. These two factors largely determine the economics of reuse, since the required make-up of new adsorbent per unit of purified product will be governed by additions of adsorbent necessary to maintain a workable activity level and to maintain the original volume of adsorbent. It is an important objective of this invention to maintain the activity of the carbon at a high controllable level, so that the volume losses will control the make-up and even these losses will be reduced to a minimum by suitable means of handling.

As a matter of fact, under some conditions, the process may even be responsible for producing more surface active adsorbent than was originally introduced into the process. This occurs where the adsorbed organic impurities decomposes to form a carbon deposit which itself becomes activated in the process. In other words, the recovery of activated adsorbent may be over 100 percent. Generally, however, the impurities adsorbed on the surface active adsorbent may either be organic or inorganic. If organic they tend to oxidize to form carbon monoxide or carbon dioxide and water or volatile acids such as acetic acid, i.e., products which are easily separated from the activated adsorbent, and which are vented from the reactor. If inorganic, they usually oxidize to form water soluble products or water insoluble solids such as oxides, salts or gaseous products such as sulphur dioxide or carbon dioxide.

When regenerating a spent carbonaceous material it is necessary to reopen substantially all the pores, both large and small, over the entire pore spectrum in order to obtain a completely reactivated carbon that will not undergo slow progressive changes in adsorptive characteristics after repeated reactivations. Though the the larger pores play the main role in decolorization, the finer ones are, nevertheless, important in removing impurities of low molecular weight, which are often responsible for color development in organic liquors.

Heating alone will remove a portion (often substantial) of the adsorbent impurities by volatilization and destructive distillation of the deposit. Such removal, however, is always incomplete and leaves a carbonized deposit on the inner adsorptive surface. At this stage the carbon possesses a large proportion of its initial decolorization power, since the larger pores which are the sites of color adsorption are quite effectively opened up. Repeated adsorption and heating cycles, however, result in a gradual increase in density and decrease in adsorptive power until the adsorbent is very ineffective.

Once this process has been allowed to progress over several cycles, the carbonized deposit becomes very refractory to oxidation and it becomes increasingly difficult, if not impossible, to remove it without burning some of the original carbon skeleton, even by controlled oxidation.

Thus it is of primary importance for complete reactivation, to remove the remaining deposit selectively and to do so immediately and completely after each use so as to maintain the greatest selectivity in the process.

In order to remove the carbonized deposit effectively, while leaving the original activated carbon skeleton intact, thus maintaining its original hardness, it is of extreme importance to control the oxidative potential of the gases used in burning away the non-volatile deposit from the active surface of the carbon. Factors influencing this potential are, (a) gas composition and, (b) temperature. In regard to temperature, considerable latitude is possible by control of the gas composition, but as the temperature goes below 1300 degrees F., less and less control of oxidative potential is obtainable if the rate is to be maintained at a practical level. At the high end of the temperature range, both exothermic and endothermic oxidative reactions can take place at reasonable rates, and a careful balance of gas composition can be maintained to effect a high degree of selectivity and control of decarbonization rate. Normally, the temperature range must be kept between 1300 and 1800 degrees F., and preferably, between 1700 and 1800 degrees F.

It has also been found that when air is used as the oxidizing gas, the selectivity may be vastly improved by small to moderate additions of steam. The reactivation with steam is more uniform throughout the interior of the particle. For example, the true activating function of air starts at a comparatively low temperature of around 800 degrees F. whereas with the addition of steam, the activating function begins to take place around 1500 degrees F. Thus the mixture of the two gases produce the most uniform and highly active product.

Using the herein described method, the materials to be carbonized or reactivated are dispersed within and carried in suspension by the combustion products of the reactor charge and the volatilized organic materials and moisture generated during activation. In doing so, each particle is surrounded by a heated atmosphere and is individually treated. The time of treatment is accurately controlled by manipulation of the speed and volume of the reaction products and the temperature is controlled by the planned characterization of combustion. Specifically, the raw material is introduced into the lower end of a vertical reaction chamber of previously calculated size and length, and the activating gases are introduced contemporaneously with the material charge in a current of such velocity and force that the particles of material become suspended in the moving gaseous atmosphere for a period of time sufficient to attain the degree of activation desired. Owing to the intimate contact of the material with the activating gases, and to the state of division of the material, the time needed for activation is quite short. It is important to note that while the solid material and the several gases are continuously introduced at the lower part of the retort, the activated material is continuously drawn off from the upper part of the reactor.

Using the preferred method and apparatus of this invention, the wet or dry carbonaceous solids are fed mechanically into a feed chamber where steam and/or air conveys the solids a short distance into a venturi throat connecting a combustion chamber with the reactor. The high velocity and turbulence of the combustion products plus the instantaneous expansion and flashing of the feed stream and any moisture or volatiles in the carbonaceous solids results in an almost instantaneous heat transfer and mixing of the gases of combustion and the solid reactant charge. The temperature of the combustion products is reduced to the desired operating temperature by the heat load of the raw material feed, moisture in the feed, steam and/or any air which may be introduced in controlled amounts with the feed. The suspended solids are conducted into the bottom of the reactor where the moisture is driven off and the adsorbed organics are gasified and/or driven to the surface of the carbonaceous solids. The controlled amount of oxygen in the gas phase surrounding the carbon particles oxidizes the more available volatiles producing a substantial heat release, thus reducing the heat input requirement to the reactor. The oxygen also improves the capacity of the reactor due to its high rate of burn off of the adsorbed organics over that of the slower steam-carbon reaction. Steam, either from the moisture in the feed or by controlled addition, seems to improve the selectivity of the oxygen during this volatile destruction phase. The steam plays a major role in reaching final activity level, especially in the small pore size range as measured by the IV (Iodine Vaue) test. Oxygen, when used by itself as an oxidizing gas for reactivation, will provide excellent large pore size development in a relatively short residence time but at lower yield and lower iodine values than will be attained when used in combination with steam. Of course, the oxygen/carbon reaction, the steam/carbon reaction, and the carbon dioxide/carbon reaction will occur simultaneously at various locations in the reactor, depending upon gas concentrations of the reactants and the temperature. It has been observed that the oxygen/carbon reaction is carried out predominantly in the lower half of the reactor as shown by the almost instantaneous exhaustion of the oxygen in the gas phase and the high heat release in this section. The steam/carbon reaction would appear to be active throughout the reactor where steam concentration and temperature are favorable. The high velocity at the throat of the venturi duct prevents any build-up of solids on the wall of the throat or in the combustion chamber. By the time the material enters the reactor, the solid phase is substantially dry and free of any tacky volatiles, and is evenly suspended in the gas phase thus preventing any build-up on the reactor wall. After passing through the reactor, the activated or regenerated carbon may be collected dry by cyclones and bag filtered, or by wet scrubbing and pressure filtering.

Consequently, a high yield, high quality activated carbon is produced in a short residence time using a system very simple in construction with no moving parts in the high temperature section.

DESCRIPTION OF DRAWING

FIG. 1 shows a front view partially in section of one embodiment the apparatus may take in carrying out the process;

FIG. 2 shows an enlarged cross-sectional view of the lower end of the reactor chamber for the activation apparatus; and, FIG. 3 shows an overall schematic view of the activation apparatus including the recovery system.

DETAILED DESCRIPTION

FIG. 1 shows more or less schematically the proposed apparatus for producing activated carbon from a virgin raw material or for regenerating a spent activated carbon. The apparatus is designed and intended for the treatment of raw material in a finely divided or powdered state. The need for such an apparatus and process has become especially acute with the expanded applications for the use of activated carbonaceous materials as a means for eliminating water pollution. Not only are municipalities using more and more activated carbon in their water purification programs, but waste water from industrial sources is also being treated with activated carbon as an anti-pollution means. Since these and other new applications have generated a need for large quantities of powdered, activated carbon, an inexpensive, practical and efficient method for producing activated carbon, and for the regeneration of spent activated carbon is an obvious necessity.

Accordingly, the drawing illustrates as the main portion thereof, an elongated transport reactor, arranged generally in a vertical plane and designated by the reference character 10. The raw material feed in its finely divided state is introduced into the reaction chamber of the transport reactor from a hopper element 11 mounted on the side of the transport reactor. The raw material feed is conducted into the reaction chamber by any means depending upon the form of the raw material. Since the raw material may be either in a wet or a dry powdered form, the feeding apparatus from the hopper 11 to the transport reactor 10 would be designed accordingly. For a relatively wet material still in solid form but containing surface moisture a mechanical feeding device could be used. Specifically, for a corn syrup spent carbon the material would be considered wet if the moisture content was in the range of between 60 and 75% by weight. For moist material, i.e., material containing less than 60% water, it would be feasible to forceably blow the raw material into the reaction chamber of the transport reactor. This latter form of raw material feed could be accomplished with the aid of a centrifugal blower or other forced air feeding means.

Mounted at the extreme outer end of the auger-type screw element 12, there is a pulley drive means 13 driven by a belt 14 from the motor 5. The motor is preferably of variable speed and rheostatically controlled in order to selectively control the feed rate into an intermediate feed chamber of the transport reactor. It is desirable to introduce the oxidizing gas comprising either steam and/or air into the reactor at or substantially near the area where the raw material feed charge is admitted. This feature can be accomplished in different ways with only one means shown. The drawing illustrates a tubular duct element 15 immediately below the auger-type feed screw element 12 where the steam mixes with the carbonaceous charge 16 in the small feed chamber 17. The feed chamber 17 is preferably located upstream of the reactor combustion chamber 18 in the area of a necked down portion of the reactor to form a venturi throat 19 thereby enhancing the turbulent admixture of combustion gases, carbonaceous raw material and superheated steam. This particular arrangement has provided a more than adequate contemporaneous mixing of the different products thereby accounting for the extremely fast acting reaction and high yield of activated carbon products.

The mechanics of operation of the process proceed as the steam and/or air from duct 15 conveys the solid charge 16 in its finely divided state through the feed chamber 17 and into the venturi tube 19. At this point the feed steam, the moisture present and the volatiles on or in the carbonaceous raw material mix with the high temperature combustion products from the combustion chamber 18. The combustion chamber 18 is fed with a fuel, such as natural gas or propane, through a line 21 in the presence of excess air to produce the high temperature combustion. The combustion chamber consists of an outer shell of bulk ceramic insulating fiber 31. Inside the ceramic insulating fiber 31 and adhered thereto is another annular ring of insulating castable 32, a relatively small layer of ceramic blanket and finally a high temperature plastic refractory inner wall 33. This combination of insulating and heat resistant layers permits the combustion chamber to operate at temperatures ranging up to 3200 degrees F. as measured by the thermocouple 34.

Meanwhile, the throat area 19 of the venturi duct has been sized so that a high velocity of the gaseous products is insured to prevent any of the carbonaceous solids from dropping into the combustion chamber 18 and also to prevent any build-up of solid materials on the walls of the venturi throat. Accordingly, the gas and solid phases attain an optimum and uniform heat transfer and mixing of the phases almost instantaneously. The suspended solid phase is then carried through the reactor, supported by the gaseous reactants and products, for the required residence time to permit devolatilization, thermal cracking and the requisite reactions between the different products. The lower portion of the transport reactor arbitrarily referred to as Zone I produces a drying and initial devolatilization of the raw material. In Zone II, an exothermic reaction occurs wherein the primary oxidation of the organic volatiles and carbon deposits takes place in the presence of oxygen. Finally, the steam activation occurs in Zone III where the water and carbon combine to produce carbon monoxide, carbon dioxide and hydrogen in an endothermic reaction. The zone divisions marked off generally on the drawing and identified by the thermocouple units 34–35, 35–36 and 36–37, are not intended to be definitive or limiting. It is not possible to know exactly where the different reactions take place, but theoretical calculations have shown that the different reactions do occur substantially as shown. The treatments hereinbefore described operate on the raw material to produce either an activated raw carbonaceous solid or they together reactivate a spent activated carbon, depending upon the type of raw material used.

The products of combustion and activated carbon then proceed up through the upper part of the transport reactor which consists of a section of stainless steel pipe 22, surrounded by high temperature insulation 23. This construction maintains the adiabatic conditions on the exterior of the reactor and is responsible for maintaining a uniform high temperature throughout the length of the reactor. The suspended solids then pass through a manifold 25, which includes a pressure relief vent 26 at the upper end thereof to render the apparatus explosion proof, and then through a suitable duct 27 to the recovery system of the apparatus.

As noted hereinbefore, the type of recovery system chosen for recovering the now activated carbonaceous solid may take any one of several forms, but for experimental work, a water scrubbing unit was used as the preferred method. FIG. 3 of the drawing shows the recovery system in more or less schematic form as consisting of two eductor scrubbers 40, 41 installed in series with the product from each eductor draining into a water box recovery tank 42. From the water box 42 a pump 43 recycles the thin product slurry back through the eductors 40, 41 and provides the necessary pressure for a bleed-off of the slurry to five pressure filters 45–49. The eductor scrubbers each operate on the reactor gaseous products to remove the activated carbon therefrom by passing the gaseous mixture in the presence of a high pressure water flow. The activated carbon is then slurried with the washing water where it can be separated therefrom by the pressure filters 45–49. When the final product leaves the filters, the activated carbon product is collected for ultimate use. When collected dry with another system, it can be immediately bagged for shipment.

A laboratory pilot plant was constructed for conducting tests to determine the optimum operating conditions and to develop the apparatus for carrying out the various steps of the process. The pilot plant was constructed along the lines of the unit illustrated in the drawing in FIG. 2 and comprised the following equipment. Initially, a Bethlehem Corporation Porcupine Processor was obtained for pre-conditioning the samples of spent carbon prior to activation. It consisted of a 12 inch diameter by 36 inch long horizontal cylindrical container with a steam heated rotating element and a steam jacketed shell. In this container, the carbon samples were prepared by reducing the moisture content of the raw material to not more than 75% by weight, or lower, to facilitate the feeding of the material.

The feeder unit was constructed from a stainless steel hopper having dimensions of 14 x 14 x 26 inches representing the width of the two side walls and the depth of the entire unit. The lower part of the hopper was then tapered in one direction so as to accommodate a one-inch auger-type screw feeding element located in the bottom of the hopper and extending into the housing of the reactor itself. The screw was driven by a Zero-Max variable speed motor drive to control the material feed rate and to discharge the carbon sample into the feed chamber adjacent the venturi throat of the reactor combustion chamber.

The furnace, or combustion chamber portion of the reactor was constructed as shown specifically in FIG. 2 with a 24 inch diameter and a depth of 18 inches. It had a shell constructed of pipe with a welded flat steel bottom plate and a stainless steel cover plate. The inner core of the combustion chamber was made up from high temperature plastic insulation in the shape of a venturi with an orifice diameter of ¾ inch. The combustion chamber was then made to sit on suitable burner blocks and was connected with the bottom of the reactor column. The insulation surrounding the combustion chamber consisted of rings of high temperature castable and bulk fiber insulating materials while a North American XS 4424–O high temperature nozzle mixing gas burner was attached in a vertical position to the furnace bottom.

For the reactor column a 6 inch diameter by 72 inch long, No. 310 stainless steel pipe was flange connected to the furnace top and capped off with a stainless steel T and pressure relief vent. The T section was necessary to provide an exit for the combustion gases and product while the explosion proof vent was added for obvious safety reasons. Electric heating elements, rheostatically controlled, were located on the outer surface of the stainless steel column to compensate for any heat losses through the wall of the reactor and to maintain a reasonably constant temperature throughout the column length.

The recovery system comprised a water scrubbing unit made up from a 4 inch stainless steel pipe inclined at 45 degrees and connected to two Schutle & Koerting venturi scrubbers arranged in series. The first unit was a 4 inch unit with the second being a 3 inch unit, both of which discharged the wetted product into a stainless steel 30 gallon capacity recovery tank. The exhaust gases were handled through a duct with an exhaust blower to the outside atmosphere. The water used for the scrubbers was taken from the city water supply and continually collected in a separate 50 gallon tank discharging to a 1170 gallon per hour, 1 H.P. Moyno pump for delivery to the scrubbers. The recovered product in slurry form was then pumped by a 2 H.P., 20 gallon per minute centrifugal pump to six, 16 inch diameter pot pressure type filters.

The propane gas used for combustion fuel was measured by a Rockwell Manufacturing Company test meter with a North American Limiting Orifice Gas Valve to provide the desired air/gas ratio at the burner.

Combustion air was furnished by a North American blower, Series 2300, at 10 p.s.i. pressure from a single stage compressor, directly connected to a ¾ H.P. motor.

Steam for the reactor was furnished at 30 p.s.i. through a Fischer & Porter flow-rate device. It was delivered through a ¼ inch tube located below the screw feeder housing and discharged into the combustion chamber with the spent carbon feed.

With the above apparatus, a series of experiments were run to investigate the reactor performance over a temperature range and to study the results obtained by varying the spent carbon feed rate, steam feed rate, and oxygen concentration in the burner combustion products. The spent carbon used in these experiments was a commercial corn syrup spent carbon which was originally a Nuchar CEE grade with an average MV (Molasses Value) of 160 and an average IV (Iodine Value) of 92 to 96. The spent carbon had an average MV of 50 and IV below 50.

The outcome of these experiments is reproduced below in tabular form.

EXAMPLE I

In this experiment a commercial corn syrup spent activated carbon was used to determine the effectiveness of the reactivating process over a range of temperatures. The feed rate was maintained at a steady rate of 2.85 lbs./hr. (dry basis) with a steam feed of 3.2 lbs./hr. The various temperature levels were reached by increasing the gas firing rate and the rate of oxygen in the excess air passing through the burner. This oxygen contributed to the temperature by the heat release resulting from oxidation of the volatiles being vaporized off the spent carbon.

EXAMPLE I

| | Temp. | Oxygen,* lbs./hr. | MV | IV | Remarks |
|---|---|---|---|---|---|
| Trial: | | | | | |
| 1 | 1,300 | .82 | 67 | 57.8 | Satisfactory regeneration obtained after reaching 1,800° F. |
| 2 | 1,400 | 1.11 | 93 | 80.9 | |
| 3 | 1,500 | 1.14 | 100 | 81.0 | |
| 4 | 1,600 | 1.18 | 104 | 82.0 | |
| 5 | 1,700 | 1.40 | 129 | 84.5 | |
| 6 | 1,800 | 1.58 | 173 | 87.7 | |

*Calculated flow rate of oxygen in the burner combustion products.

The results illustrated that with increasing temperature and oxygen, the MV and IV increased until 1800° F. was reached where satisfactory values were attained that were equivalent to the original activated carbon.

EXAMPLE II

In this experiment, another sample of a commercial corn syrup spent activated carbon was used but the steam rate was increased to 6.4 lbs./hr. for all trials over the same temperature range employed in Example I. The spent carbon feed containing about 10% moisture was maintained at 2.57 lbs./hr. (dry basis) with the oxygen flow rate in the burner combustion products varying between 1.65 lbs./hr. to 2.77 lbs./hr. generally increasing with temperature as the burner firing rate was increased to reach each higher temperature level. Measurements were taken as above in Example I with the following results.

EXAMPLE II

| | Temp. | Oxygen,* lbs./hr. | MV | IV |
|---|---|---|---|---|
| Trial: | | | | |
| 1 | 1,300 | 1.64 | 91 | 77.0 |
| 2 | 1,400 | 1.61 | 113 | 83.9 |
| 3 | 1,500 | 1.45 | 133 | 85.6 |
| 4 | 1,600 | 2.19 | 164 | 89.3 |
| 5 | 1,700 | 2.77 | 219 | 91.6 |
| 6 | 1,800 | 2.64 | 198 | 91.8 |

*Calculated flow rate of oxygen in the burner combustion products.

This experiment illustrates the improved performance attained by operating the apparatus with higher steam and oxygen rates than was used in Example I. Again, the operating temperature at which satisfactory MV and IV was reached was in the higher range above 1700° F.

EXAMPLE III

In this experiment, a commercial corn syrup spent activated carbon was used at much higher feed rates with relatively constant rate of flow of oxygen in the burner combustion products but increasing rates of steam flow. The temperature was maintained at 1800° F.

| | Feed rate, lbs./hr., dry basis | Oxygen, lbs./hr.* | Steam, lbs./hr. | MV | IV |
|---|---|---|---|---|---|
| Trial: | | | | | |
| 1 | 5.65 | 2.60 | 6.4 | 160 | 91.1 |
| 2 | 6.13 | 1.94 | 3.2 | 145 | 89.0 |
| 3 | 5.85 | 2.57 | 0 | 123 | 84.9 |

*Calculated flow rate of oxygen in the burner combustion products.

The experiment illustrates that spent carbon feed rate could be increased above the levels in Experiments 1 and 2 for the same fixed reactor volume of 1.2 ft.³ if the minimum steam flow rate is equal to the spent carbon feed rate.

EXAMPLE IV

In this experiment a commercial corn syrup spent activated carbon was regenerated at a feed rate of 7.15 lbs./hr. for three hours and 28 minutes. The steam flow rate was 9 lbs./hr. and the oxygen flow rate in the burner combustion products was 3.99 lbs./hr. The temperature was maintained at 1800° F. in the reactor and the moisture in the spent carbon averaged 6%. The average fixed carbon content of the spent carbon was 64.4% (dry basis). This value was obtained using a volatile analysis test wherein a sample was weighed before and after heating to a temperature of 1800 degrees F. in an inert atmosphere. The fixed carbon content value thus obtained became a measure of the original activated carbon in the spent carbon sample. Knowing this value plus the physical yield on the spent carbon, determined by measuring the input and output rates to and from the reactor, the percent yield on the original carbon was calculated.

| Input | | Output | |
|---|---|---|---|
| Feed rate (dry basis), #/hr | 7.15 | Product rate, #/hr | 4.21 |
| Steam, #/hr | 9.0 | MV | 212 |
| O₂ in burner comb. products, #/hr. | 3.99 | IV | 92.9 |
| Percent fixed carbon in spent carbon feed. | 64.4 | Percent on spent carbon | 4.21/7.15=58.8 |
| Spent carbon moisture, percent. | 6 | Percent yield on original activated carbon. | 58.8/64.4=91.8 |
| Reactor volume, cu. ft | 1.2 | Residence time, sec | 1.5 |

NOTE.—Reactor temperature constant 1,800 degrees F.

The purpose of Experiment IV was to demonstrate the effectiveness of the system to activate in the same fixed reactor volume at a higher feed rate than the prior samples, while achieving satisfactory activity and yield. The results obtained demonstrated this feasibility and illustrated that a spent activated carbon material could be reactivated with a feed rate of at least 6 lbs./hr./cu. ft. of reactor volume if the steam flow rate in the reactor was at least equal to the spent carbon feed rate. Of course, ample oxygen had to be made available to instantaneously oxidize the organic volatiles generated when the spent carbon feed mixed with the combustion products. The very good yield on original activated carbon, as measured by the ratio of the percent yield on spent carbon to percent fixed carbon in the spent carbon feed, was 91.8%. These results were demonstrated over an extended run to insure accurate yield measurement.

The measurements taken of IV (Iodine Value) and MV (Molasses Value) were used to make a quick and reasonably accurate check on the activation process. Each of the tests are commonly used in the industry and thus are easily related to the kind of information desired by the users of activated carbon.

The MV test is performed by comparing the MV of the carbon under examination with the MV of a reference carbon that is kept as a standard. The IV represents the percentage of iodine adsorbed by the carbon sample. It is a measure of the total internal surface area present in the product. The increasing iodine values thus show a sizable increase in fine pore volume and consequently an attainment of selective oxidation of the order desired.

The experiments also showed that steam was necessary in the process only under those conditions where raw material in an extremely dry state was being reactivated. When wet raw material was used, the water in the material would make its own steam. The results also confirmed earlier theoretical conclusions which indicated that the optimum operating conditions for regeneration occurred when the water content in the liquid or vapor phase was substantially equal to the dry material feed rate.

The experiments noted above, and others not reproduced herein have been directed to the regeneration of spent corn sugar and corn syrup carbons, but the experience gained thereby makes the process appear highly likely for use with spent powdered carbon from other applications such as cane sugar spent carbon or any other carbons containing organic materials. In addition, the process and apparatus described herein could be used for regeneration at a very high yield on powdered carbon from tertiary treatment of sewage effluent, or from powdered carbon used to replace activated sludge in secondary treatment of sewage. The novel process and apparatus described herein could also be used to regenerate powdered carbon used in removing organic impurities from chemicals and pharmaceuticals, or other fluids.

The transport reactor of the present invention will also make regeneration of other novel types of powdered carbon practical. For instance, powdered coal carbon, or other carbons, with a partical size small enough for transport regeneration, but much larger than present powdered carbons, might be more easily regenerated and recovered since the chosen particle size will improve filtration because of the greater density and filterability. In addition, transport regeneration with an attendant reduction in carbon consumption will make it economical to use higher activity carbons for make-up, thus optimizing the purification job. Finally, due to the low cost and high yield of transport regeneration, it will become feasible to use acid washed or other special carbons as make-up.

As another example showing the use of the herein described apparatus and process for the activation of virgin raw material, several trials were run on a bark char carbonaceous solid to improve or develop its activity.

EXAMPLE V

Trial conditions:
  Reactor temperature, 1,800 degrees F.
  Steam, 16 lbs./hr.
  Propane, 8.31 s.c.f.h. with 2.2% oxygen in the combustion products
Results:

| | Feed rate of bark char, lbs./hr. | Feed, MPV | Product rate, lbs./hr. | Product, MPV | Yield, percent |
|---|---|---|---|---|---|
| Trial No.: | | | | | |
| 1 | 9.62 | 22 | 7.30 | 17 | 76 |
| 2 | 14.20 | 20.8 | 11.25 | 17 | 79.4 |
| 3 | 15.00 | 20.8 | 11.55 | 17 | 77.0 |

Example V demonstrates the effectiveness of the transport reactor system to improve or develop the activity of the carbonaceous solid such as bark char. The activity measured is the modified phenol value (MPV), which is an activity test used for measuring the performance of activated carbon for the treatment of potable water. The MPV represents the carbon dosage in parts per million required to reduce a phenol concentration from 200 p.p.m. to 20 p.p.m. The American Water Works Association uses a phenol adsorption test as one of the tests for measuring the adsorptivity of activated carbon used for treatment of potable water.

In the example, a char collected from a bark burning boiler was passed through the reactor system at three levels of feed rate with a steam rate of 16 lbs./hr. The burner system below the feed point was burning 8.31 standard cu. ft./hr. of propane with 2.2% oxygen in the combustion products. In all three trials, the MPV of the product was substantially above the MPV of the feed and better than the usual MPV specification for a potable water treatment activated carbon. In the third trial, the transport reactor system was able to obain a carbon with a good MPV at a high feed rate of 12.5 lbs./hr./cu. ft. of reactor volume and a product rate of 9.60 lbs./hr./cu. ft. of reactor volume. The average yield for the three trials was 77%. The uniformity of the product MPV indicates the high feed rate in the third trial is by no means the maximum feed level obtainable. The reactor temperature was held at 1800 degrees F. and is considered to be more favorable than lower temperatures because of the more favorable reaction rate at 1800 degrees F. for the steam/carbon reaction. The above example shows conditions which provide an acceptable activated carbon, but by no means exemplifies the optimum conditions.

It may also be possible to employ the transport reactor in handling powdered carbon in a purification and regeneration cycle at a much lower cost than is required for hard granular carbon. In this case, the mixing, filtration, washing and carbon regeneration in a continuous process would be more economical. Furthermore, the availability of low cost regenerated powdered carbon, which will be lower in cost than granular carbon, will make other applications practical which have not yet been considered.

It has been proposed, for instance, to employ activated carbon as a means for preventing the build-up of pesticide residues in animals, particularly dairy cattle. Experiments have shown that the residues of organic pesticides already located in dairy cattle can be materially reduced by feeding slurries of carbon to the cattle. This process could be carried out by mixing pellets of activated carbon with the cattle feed either by the farmer or the feed manufacturer. The activated carbon would then adsorb the pesticides and minimize the build-up of organics in the animals body.

Hence there has been described a novel process and apparatus for which patent protection is herewith requested in the form of United States Letters Patent. It is to be understood, however, that the foregoing description of the invention is only illustrative and that various modifications, substitutions, additions and omissions may be made without departing from the spirit or principles of the invention.

I claim:

1. The process for producing activated carbon from a carbonaceous material consisting of either a virgin carbon material or a spent activated carbon, using a single stage transport type reactor having a combustion chamber at one end thereof and a reaction chamber at the other end connected together by a necked down venturi throat comprising:
    (a) reducing the carbonaceous material to a finely divided state and preconditioning it by reducing the moisture content of said carbonaceous material to 75% or less prior to introduction into said reactor;
    (b) feeding said pre-conditioned carbonaceous material into a feed chamber located adjacent to the low pressure, high velocity region of said reactor which connects the combustion chamber of said transport reactor with the reaction chamber thereof;
    (c) independently introducing an oxidizing gas into the feed chamber of said reactor to surround the carbonaceous particles and oxidize the more available volatiles in the carbonaceous material;
    (d) introducing said partially oxidized carbonaceous material into the low pressure area of said reactor,
    (e) reacting said partially oxidized carbonaceous material with the combustion products of said reactor at a temperature higher than 1700 degrees F. in the presence of excess air to attain an optimum, uniform and instantaneous heat transfer and mixing of the gas and solid phases;
    (f) transporting the suspended solid phase, supported by the gaseous reactants and combustion products, throughout the length of said reaction chamber for a period of from one to five seconds to permit complete devolatilization, thermal cracking and the requisite reactions between the different products to activate said material; and,
    (g) recovering the activated material while venting off the residue of the combustion products.

2. The process defined in claim 1 wherein the oxidizing gas of paragraph (c) comprises oxygen.

3. The process defined in claim 1 wherein the oxidizing gas of paragraph (c) comprises steam.

4. The process defined in claim 3 wherein the carbonaceous material feed rate and steam feed rate are substantially equal.

5. The process defined in claim 3 wherein the carbonaceous material feed rate, oxygen feed rate in the excess combustion air, and steam feed rate are all substantially equal.

6. The process defined in claim 3 wherein the carbonaceous material feed rate and oxygen feed rate in the excess combustion air are substantially equal in the presence of excess steam.

7. Apparatus for producing activated carbon from a carbonaceous material using a single stage transport type reactor comprising:
    (a) a reaction vessel having a combustion chamber at the inlet end thereof, a reaction chamber intermediate the ends thereof, and a product removal manifold at the exit end thereof;
    (b) a venturi tube connecting the combustion chamber with the reaction chamber to produce a low pressure, high velocity region within said transport reactor;
    (c) a feed chamber wgithin the wall of said reaction vessel and located upstream of the reactor combustion chamber and adjacent the low pressure, high velocity region of said transport reactor;
    (d) a mechanically activated feeding device attached to the inlet end of said reaction vessel for conducting the carbonaceous material into the feed chamber;
    (e) duct means extending through the wall of said reaction vessel and lying co-extensive with the carbonaceous material feed means for independently feeding an oxidizing gas into said feed chamber to surround the carbonaceous particles and oxidize the more available volatiles in said carbonaceous material;
    (f) second duct means for conveying the partially oxidized carbonaceous material from said feed chamber into the low pressure region of said reaction vessel to attain an optimum, uniform and instantaneous heat transfer and mixing of the combustion products and carbonaceous material at a temperature higher than 1700 degrees F. and for a duration of from 1 to 5 seconds in the presence of excess air; and,
    (g) a liquid scrubbing recovery means for recovering the activated carbon from the gaseous reactants and products of the reaction after the requisite reactions between the different products have taken place.

References Cited
UNITED STATES PATENTS

| | | | |
|---|---|---|---|
| 1,475,502 | 11/1923 | Manning | 252—417 |
| 1,641,053 | 8/1927 | Saver | 252—421 |
| 1,774,341 | 8/1930 | Von Halban et al. | 252—445 X |
| 2,166,225 | 7/1939 | Twining | 252—421 |
| 2,933,454 | 4/1960 | Repik et al. | 252—420 |
| 3,298,928 | 1/1967 | Esterer | 201—31 X |

FOREIGN PATENTS

| | | | |
|---|---|---|---|
| 213,940 | 5/1924 | Great Britain | 252—417 |
| 638,492 | 6/1950 | Great Britain | 252—417 |
| 1,377,619 | 9/1964 | France | 252—421 |

DANIEL E. WYMAN, Primary Examiner

P. E. KONOPKA, Assistant Examiner

U.S. Cl. X.R.

23—209.4, 277 R, 283; 201—31, 36; 202—117, 121; 252—417, 421